May 9, 1939. H. G. COORDES 2,157,785
SINK
Filed Aug. 6, 1936   2 Sheets-Sheet 1

INVENTOR
Harry G. Coordes.
BY
ATTORNEYS.

May 9, 1939.  H. G. COORDES  2,157,785
SINK
Filed Aug. 6, 1936  2 Sheets-Sheet 2
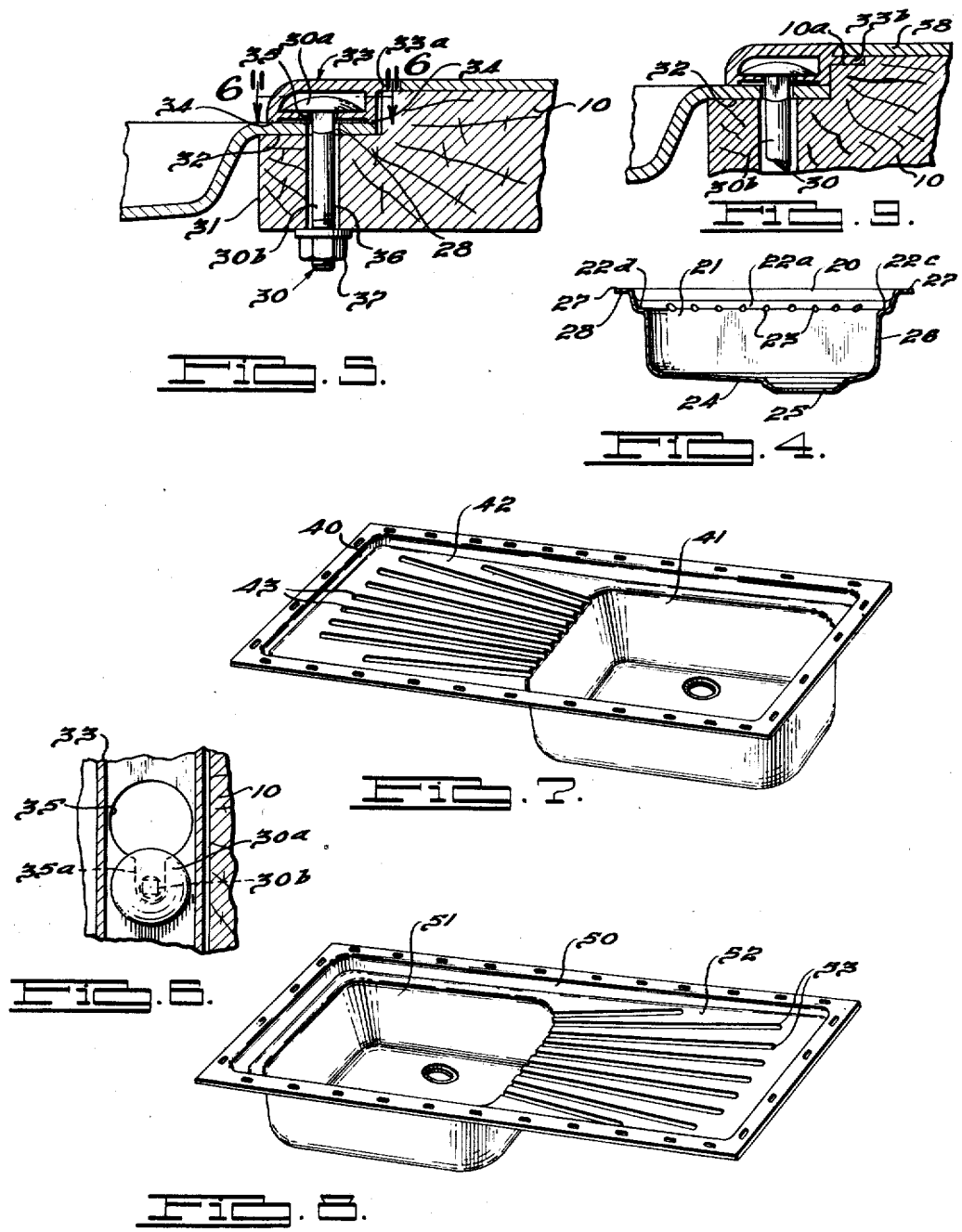
INVENTOR
Harry G. Coordes.
BY Dike, Calvert & Gray
ATTORNEYS.

Patented May 9, 1939

2,157,785

UNITED STATES PATENT OFFICE 2,157,785

SINK

Harry G. Coordes, Detroit, Mich., assignor to Briggs Manufacturing Company, Detroit, Mich., a corporation of Michigan Application August 6, 1936, Serial No. 94,647

5 Claims. (Cl. 4—187)

This invention relates to sinks and more particularly to pressed metal sinks so constructed as to permit installation thereof within openings in tables, counters and the like.

One of the objects of the present invention is to provide a seamless pressed metal sink which has a shallow main basin and a deep sub-basin formed at the bottom of said main basin, which construction permits elimination of the rolled rim and apron flanging usually provided in conventional sink structures.

Another object of the invention is to provide a novel pressed metal sink having a flat marginal rim extending around all four sides of the sink adapted to be installed nearly flush with the flat top surface of a table or counter and to be secured thereto as with the aid of suitable molding, whereby the juncture of the sink rim and the flat table surface may be made so as to provide a joint of attractive appearance and effective to prevent the seepage of water thereinto.

A still further object of the invention is to provide a sink of the above character, which is simple in construction and which is capable of being formed from a single sheet metal blank in a small number of stamping operations.

Other objects and advantages of this invention will appear in the following description and appended claims, reference being had to the accompanying drawings forming a part of this specification wherein preferred embodiments of the present invention are illustrated.

In the drawings, wherein like reference characters designate corresponding parts in the several views;

Fig. 4 is a sectional view taken on the line 4—4 of Fig. 2, looking in the direction of the arrows.

Fig. 5 is a sectional view showing means for securing the sink at the top of a cabinet, section being taken on the line 5—5 of Fig. 1.

Fig. 6 is a sectional view, section being taken on the line 6—6 of Fig. 4, said view showing the opening in the molding for inserting the head of the bolt and a slot for engaging said molding with said head.

Fig. 7 is a perspective view of a modified structure, namely, of a left hand drainboard sink embodying the present invention.

Fig. 8 is a perspective view of another modification, namely, of a right hand drainboard sink.

Fig. 9 is a view similar in part to Fig. 5, showing a modified form of molding.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
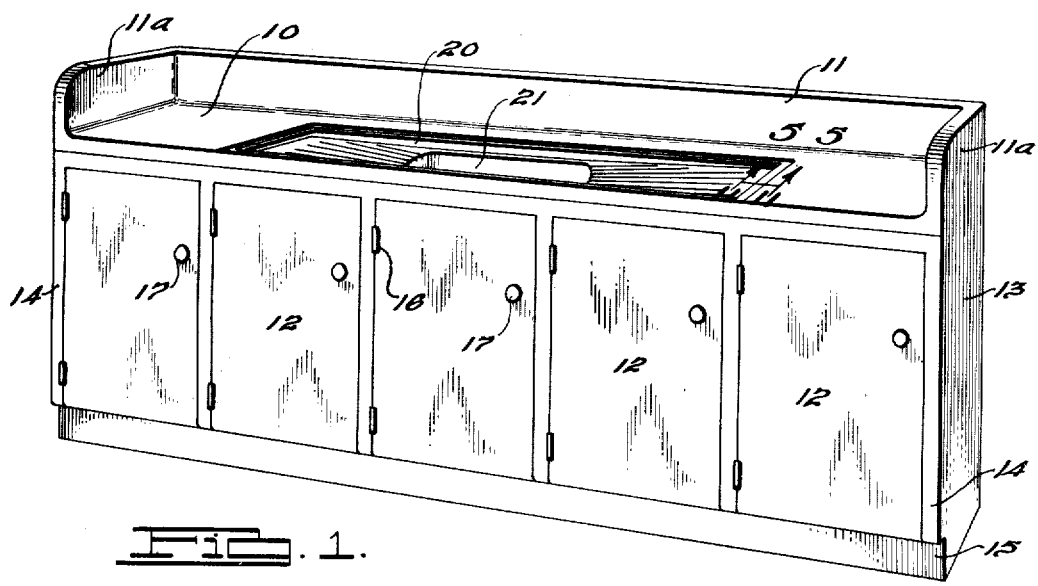
Fig. 1 is a perspective view showing the sink embodying my invention in its preferred form, arranged at the top face of a combined table and cabinet structure.
Figure 2:
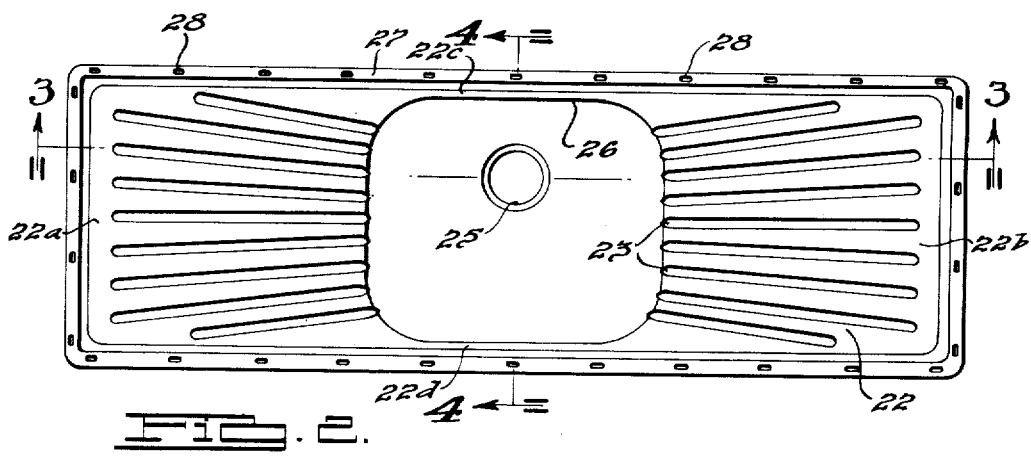
Fig. 2 is a top view of the sink of Fig. 1, said sink being shown separately.
Figure 3:
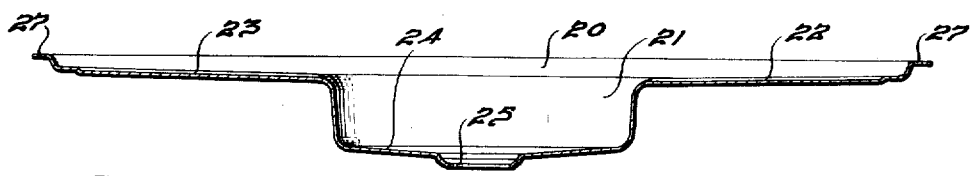
Fig. 3 is a longitudinal sectional view of the sink, section being taken on the line 3—3 of Fig. 2.

In the drawings I have shown, by way of example, three structures embodying my invention. Referring to Figs. 1 to 3 inclusive, there is herein shown a double drainboard sink comprising a shallow main basin 20, and a deep sub-basin 21 formed at the bottom of said main basin 20. It should be noted that the bottom 22 of the main basin 20 surrounds the sub-basin 21 at all four sides thereof forming portions 22a, 22b, 22c and 22d, as clearly shown in Fig. 2. The portions 22a and 22b of the bottom 22 are preferably made slightly sloping toward the sub-basin 21, and they are provided with a number of suitable drain beads or grooves such as 23, 23, said beads being correspondingly arranged in two groups, since in this embodiment the sub-basin 21 is located substantially in the middle of the elongated main basin 20. The bottom 22 of the main basin 20 merges into the walls of the sub-basin 21, the latter being made deeper than the main basin 20. The bottom 24 of the sub-basin 21 is made slightly sloping toward a drain hole, such as shown at 25, which is located in said bottom 24 closer to the back wall 26 of the sub-basin 21. Such arrangement of the drain hole is intended for the purpose of decreasing the length of the protruding parts of the faucet, since it is common to arrange faucets in such relation to the drain hole that the stream of water may be caused to flow, if so desired, right into the drain hole.

Around the edges of the substantially vertical walls of the main basin 20, there is provided a flat substantially horizontal rim 27 which extends outwardly at all four sides of said main basin 20. Said flat rim 27 is provided with a plurality of elongated holes such as 28, which holes are intended for reception of the shanks of the molding retaining bolts 30.

The combined table and cabinet structure which is adapted to have the sink embodying my invention installed in its top is shown in Fig. 1, and it comprises a horizontally extending shield 10 made preferably of wood and forming a flat top table, said shield being provided along its side and back edges with a continuous vertical panel comprising a back wall 11 and upright end walls 11a, the back wall serving as a splash board. The supporting structure is made in the form of an enclosed cabinet, having a plurality of compartments accessible through a number of suitable doors 12. The side panels 13 of the cabinet are preferably made flush with the upright end panels 11a, while the front edge of the table 10 extends up to the front panel 14 of the cabinet. The front panel 14 is recessed along its lower edge as indicated at 15, in order to provide ample toe room. The doors 12 are hinged at 16 within the openings of the front panel and are provided with suitable knobs or handles 17.

The sink is mounted within an opening 31 in the table or shield 10, the upper marginal edge of the table around the opening having a recess or stepped portion 32 to receive and support the rim 27 as shown in Fig. 5. In the present embodiment the rim of the sink is secured in place through the medium of a metal molding 33 so constructed as to provide a water tight joint. The molding may be of hollow rectangular form in cross section fitting into the recess 32 and having a flange 33a overlying the top surface of the table. The lower face of the molding is relieved to provide rim engaging ribs 34. The hollow portion of the molding houses the heads 30a of bolts 30, the heads being inserted through apertures 35 in the base of the molding and the bolt shanks 30b then shifted into the connecting slots 35a, Fig. 6. The molding may be readily assembled as shown in Fig. 5 by passing the bolt shanks through the slots 28 in the sink rim and thence through suitably located holes 36 in the table, the elongated slots in the rim providing sufficient play so that the bolts can be lined up with the holes 36. The molding is drawn down tightly and clamped in place by means of nuts 37 threaded onto the lower projecting ends of the bolts. The outer marginal edge of the molding flange 33a lies flush with the table covering 38, the latter being of any suitable waterproofed material. From the foregoing it will be seen that a joint is effected between the rim of the sink and the table which is not only attractive and ornamental in appearance but also presents the seepage of water around the edge of the rim and prevents accumulation of dirt. In the structure shown in Fig. 9, the molding is provided with a flange 33b, which is received by the recess 10a of the shield 10, the covering 38 overlying said flange 33b, as shown.

In the sink structure shown in Fig. 7, the sub-basin 41 is located at the right hand side of the main basin 40, the left hand side of the bottom 42 of the main basin being provided with drain beads 43, thus adapting the structure for use as a left hand drainboard sink. In the structure shown in Fig. 8, the sub-basin 51 is formed at the left hand side of the bottom 52 of the main basin 50, while the right hand side thereof is provided with a number of drain beads 53, thus adapting the structure for use as a right hand drainboard sink.

In producing each of the several sinks above described a single sheet metal blank is placed in a suitable press and an intermediate portion is preliminarily drawn to provide the sub-basin, this being accomplished by suitably shaped dies. In the following operation the blank is operated upon in suitable dies to form simultaneously the main basin, the drain beads at the bottom thereof and the flat rim around the main basin. In the same operation the sub-basin may be completed as to the shape and depth, as well as embossed for the drain hole and its bottom made sloping toward said embossed portion. In the following operations the blank is trimmed around the marginal edge of the flat rim, the holes in the rim are punched and the drain hole pierced and countersunk. These operations may be performed either separately, or simultaneously in a multiple acting press. It is to be understood, however, that my invention is not limited to the sequence of steps herein given, as obviously certain steps may be combined or rearranged in different order.

Considered from one of its broader aspects, my invention contemplates providing a novel sink adapted to be secured within an opening in a table, counter or the like, which sink comprises a shallow main basin and a deep sub-basin formed at the bottom of said main basin, and a flat rim surrounding the main basin, all being formed as an integral seamless unit from a single metal blank. By thus eliminating any welds in the sink the latter is adapted to be provided with an enamel coating wholly free of imperfections and blemishes. It will be clear from an examination of the described structures that while the same are extremely simple in construction and have no stiffening ribs or flanges, their operative elements, such as the main basin, the drain beads and the flat rim, are so arranged that the entire structures are extremely rigid and capable of resisting high distorting forces.

I claim:

1. A sink of the type adapted to be set into an opening formed in a supporting surface and to overlie the edge of the surface and pressed from a single metal sheet to provide a generally rectangular fluid receiving bowl terminating in a sloping drainboard at at least one side thereof and in a narrow flat horizontal rim extending seamlessly around all four sides of the bowl and being adapted to overlie the edges of said supporting surface, the rim being separated from the face of the drainboard and the upright walls of the bowl by a stepped portion extending continuously around all four sides of the tank.

2. A sink pressed from a single metal sheet to provide a generally rectangular fluid receiving bowl terminating in a sloping drainboard at at least one side thereof and in a narrow flat horizontal rim extending seamlessly around all four sides of the bowl and being adapted to overlie the edges of a supporting table for the sink, the rim being separated from the face of the drainboard and the upright walls of the bowl by a stepped portion extending continuously around all four sides of the sink, and a molding coextensive with said rim for securing the same to a table or the like.

3. A sink formed from a single sheet metal blank and comprising a shallow main basin, a deep sub-basin formed at the bottom of said main basin, the bottom of said main basin extending at all four sides of said sub-basin, and a continuous flat rim provided along the upper edges of said main basin and extending horizontally and outwardly therefrom and being adapted to overlie the edges of a supporting table for the sink, said rim being provided with a plurality of holes adapted to receive bolts for securing said rim to the edges of such supporting table.

4. A sink formed from a single sheet metal blank and comprising a shallow main basin, a deep sub-basin formed at the bottom of said main basin, the bottom of said main basin extending at all four sides of said sub-basin, and a continuous flat rim provided along the upper edges of said main basin and extending horizontally and outwardly therefrom, said rim being adapted to overlie the edges of a supporting table for the sink and provided with a plurality of holes adapted to receive bolts for securing said rim to the edges of said supporting table, and a molding overlying said rim and adapted to be secured thereto by the bolts.

5. A sink pressed integrally from a single metal blank and comprising a fluid receiving bowl terminating at at least one side in a sloping drainboard, and a continuous relatively narrow flat horizontal rim of uniform width extending seamlessly around all four sides of the bowl, said rim being offset upwardly from the bottom face of the drainboard and outwardly from the end wall of the bowl.

HARRY G. COORDES.

CERTIFICATE OF CORRECTION.

Patent No. 2,157,785.  May 9, 1939.

HARRY G. COORDES.

It is hereby certified that error appears in the printed specification of the above numbered patent requiring correction as follows: Page 2, second column, line 47, claim 1, for the word "edge" read edges; line 57, same claim, for "tank" read sink; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.

a continuous flat rim provided along the upper edges of said main basin and extending horizontally and outwardly therefrom and being adapted to overlie the edges of a supporting table for the sink, said rim being provided with a plurality of holes adapted to receive bolts for securing said rim to the edges of such supporting table.

4. A sink formed from a single sheet metal blank and comprising a shallow main basin, a deep sub-basin formed at the bottom of said main basin, the bottom of said main basin extending at all four sides of said sub-basin, and a continuous flat rim provided along the upper edges of said main basin and extending horizontally and outwardly therefrom, said rim being adapted to overlie the edges of a supporting table for the sink and provided with a plurality of holes adapted to receive bolts for securing said rim to the edges of said supporting table, and a molding overlying said rim and adapted to be secured thereto by the bolts.

5. A sink pressed integrally from a single metal blank and comprising a fluid receiving bowl terminating at at least one side in a sloping drainboard, and a continuous relatively narrow flat horizontal rim of uniform width extending seamlessly around all four sides of the bowl, said rim being offset upwardly from the bottom face of the drainboard and outwardly from the end wall of the bowl.

HARRY G. COORDES.

---

CERTIFICATE OF CORRECTION.

Patent No. 2,157,785.  May 9, 1939.

HARRY G. COORDES.

It is hereby certified that error appears in the printed specification of the above numbered patent requiring correction as follows: Page 2, second column, line 47, claim 1, for the word "edge" read edges; line 57, same claim, for "tank" read sink; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.